United States Patent [19]

Anderson et al.

[11] Patent Number: 4,617,270

[45] Date of Patent: Oct. 14, 1986

[54] ALCOHOL AND DISTILLERS GRAIN RECOVERY PROCESS

[76] Inventors: Clyde G. Anderson, 426 9th Dr.; Tomas E. Vara, P.O. Box 3128, both of Vero Beach, Fla. 32960

[21] Appl. No.: 494,401

[22] Filed: May 13, 1983

[51] Int. Cl.⁴ .......................... C12P 7/06; C12C 11/00
[52] U.S. Cl. ...................................... 435/161; 426/11; 435/162; 435/163; 435/164; 435/165
[58] Field of Search ................... 426/11; 435/161–165

[56] References Cited

U.S. PATENT DOCUMENTS

| 4,349,628 | 9/1982 | English et al. | 435/161 |
| 4,358,536 | 11/1982 | Thorsson et al. | 426/11 |
| 4,402,792 | 9/1983 | Horst et al. | 435/161 |

FOREIGN PATENT DOCUMENTS

| 2412859 | 9/1975 | Fed. Rep. of Germany | 426/11 |
| 0535344 | 12/1976 | U.S.S.R. | 426/11 |

*Primary Examiner*—Christine M. Nucker
*Attorney, Agent, or Firm*—Eugene F. Malin

[57] ABSTRACT

A process for producing alcohol and dried distillers grain from a source material containing starch or sugar by cooking, by saccharification, fermentation, evaporation, distillation, and wherein the distillers grain is dried by heat produced by flash cooling of effluent from cooking of the source material and by air heated by heat exchange with the overhead vapor from the distillation operation, the process resulting in reducing the external energy required to effect drying of the distillers grain.

28 Claims, 1 Drawing Figure

ALCOHOL AND DISTILLERS GRAIN RECOVERY PROCESS

BACKGROUND OF THE INVENTION

It is well-known to produce alcohol from natural grain, for example, corn, by cooking the corn by direct contact with steam in the presence of an enzyme thereby initiating liquification to form starch, saccharification of the starch to sugar in the presence of a second enzyme, fermenting the sugar in the presence of yeast to produce an alcohol which is thereafter distilled to recover absolute alcohol. The insoluble organic effluent material resulting from the above series of operations is dried producing dried distillers grain which is a valuable animal feed. U.S. Pat. Nos. 2,342,330 to Christensen; 2,892,757 to Markham; 4,309,254 to Dahlstrom, et al; and 4,321,328 to Hoge disclose the steps heretobefore stated as well-known.

SUMMARY OF THE INVENTION

One salutary feature of the invention is in the discovery that interposing at least one, and preferably two, flash cooling zones, between the cooking and saccharifying zones, to effect flashing of the hot mash producing flash steam which is thereafter compressed, the resultant flash steam constitutes at least one source of heat for drying of the distillers grain thereby resulting in decreased energy requirements for drying of the distillers grain.

Another salutary feature of the present invention is in the utilization of heated air obtained by indirect heat exchange with overhead vapor from the distillation of alcohol as a further source of heat to effect drying of the distillers grain. This also results in decreased energy requirements as aforesaid.

Still another significant aspect of the invention, which is patently evident, is that drying of the distillers grain by both the flash steam and heated air, both obtained as aforesaid, would naturally result in further decrease in the energy requirements for drying of the distillers grain.

Still another important contribution in the alcohol and grain recovery is in the utilization of water from the distillation operation as an extractant for separating alcohol from the solid effluent resulting from the centrifugation operation of the effluent from the fermentation operation.

In accordance with these and other objects which will be apparent hereinafter, the instant invention will now be described with particular reference to the accompanying drawings.

DETAILED DESCRIPTION OF THE INVENTION

Figure 1:
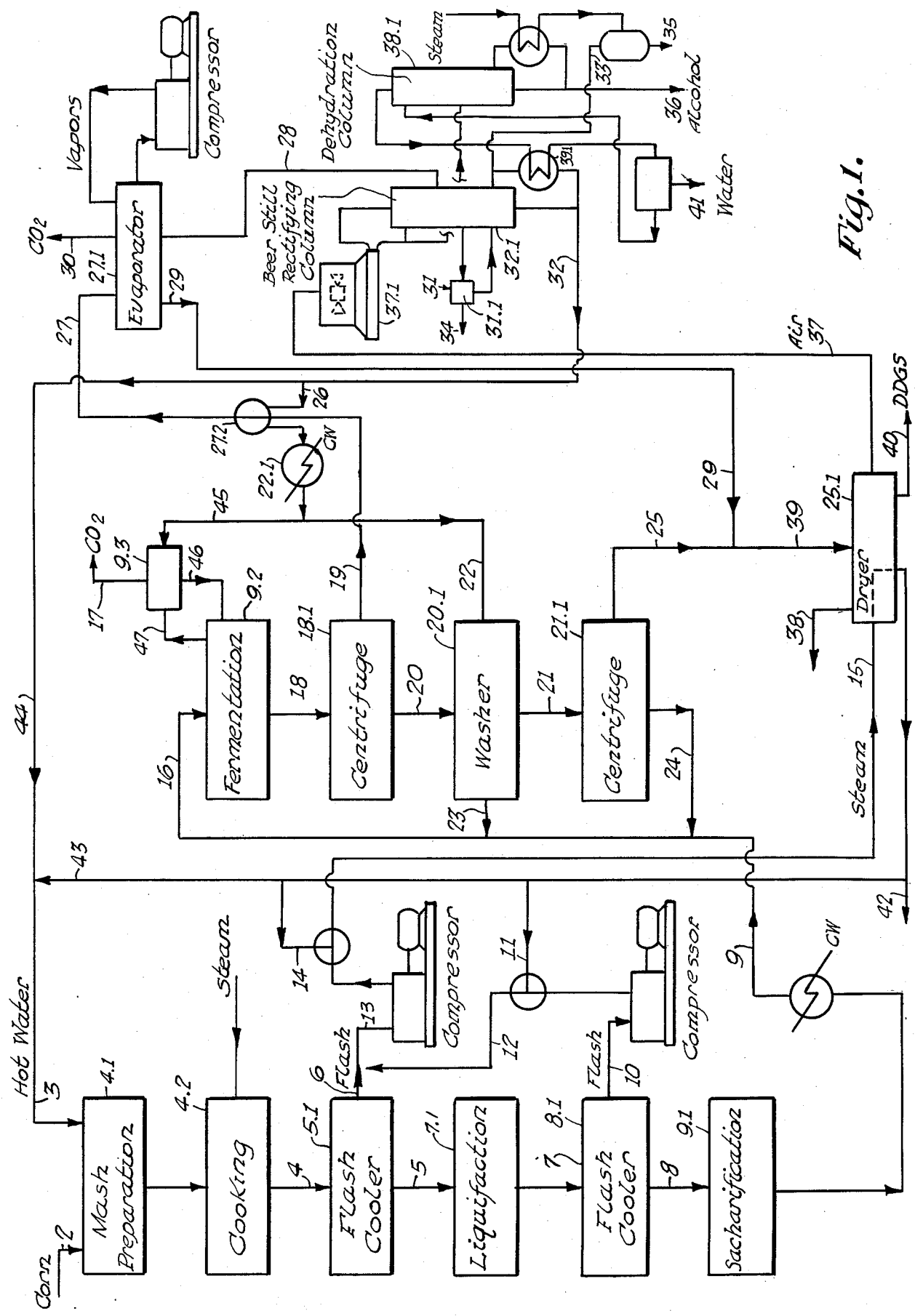
FIG. 1 is a schematic flow diagram illustrating an embodiment of the invention.

I. Preparation of Alcohol and Flash Steam

Referring to FIG. 1, corn and hot water, recycled or fresh, are introduced into mash preparation vessel 4.1 via conduits 2 and 3, respectively, the vessel including an additive to control the pH and an enzyme, the resulting mixture being conveyed through a steam ejector continuous cooker 4.2 for a finite period of time to produce a hot mash, steam being introduced via conduit 1. The hot mash is introduced into a first stage flash cooler 5.1 being maintained at a desired psia to effect flashing of the hot mash thereby resulting in reducing the temperature of the hot mash and concurrent releasing of a large quantity of flash steam for use in drying of the spent grain which is discussed in detail infra. The mash and non-flashed water are fed to a liquification vessel 7.1 resulting in an admixture of starch, spent mash and water which admixture is conveyed to a second stage flash cooler 8.1 maintained at a pressure lower than that in the first stage flash cooler to effect additional flashing of the hot flash thereby resulting in a further lowering of the temperature of the hot mash and concurrent release of a large quantity of flash steam for use in drying of spent grain as foresaid. The mash and non-flashed water are again adjusted for pH and an enzyme is added to the mash and the resultant mixture introduced into a saccharification vessel 9.1 maintained at a desired temperature thereby resulting in a partial conversion of the starch to sugar which is thereafter cooled and conveyed to a fermentation vessel 9.2 which completes the conversion to sugar and converts the sugar to liquid products, including an alcohol, vapor products including alcohol and carbon dioxide and solid spent grain.

II. Recovery of Solid Spent Grain and Alcohol Liquor

The liquid products and spent grain from fermentation vessel 9.2 are introduced into a first stage centrifuge or other separation device 18.1 which results in the formation of a thin liquor including an alcohol and a thick cake mostly of the spent grain and residual alcohol, the latter being recovered by extraction of the alcohol from the thick cake with recycled water via 22 from distillation of alcohol, discussed infra in washer 20.1.

The dealcoholated thick cake in washer 20.1 is then introduced into a second stage centrifuge 21.1 for separating additional thin liquor which is recycled via conduit 24 to fermentation vessel 9.2. The thin solution from the washer is recycled via 23 to the fermentation vessel.

Well-known volume control means (not shown) are used to control the volume of recycled water introduced into washer 20.1 and the volume of recycle thin stream to fermentation vessel 9.2 to maintain the desired concentration of the materials therein.

The cake from second centrifuge 21.1 is introduced into a the dryer via 25.

Evaporator vessel 27.1 is heated by mechanical recompression of the effluent vapors. Carbon dioxide is vented via conduit 30.

The liquor stream via conduit 19 is heated by indirect heat exchange in heat exchanger 27.2 with hot water via conduit 26 from beer still 32.1, discussed infra. The solids in the liquor stream are concentrated by evaporation and these solids via 29 are combined with the thick cake from centrifuge 21.1 and introduced into dryer 25.1, discussed infra.

III. Recovery of a Pure Alcohol

Alcohol is separated via a scrubber 9.3 from the carbon dioxide vapors from fermentation vessel 9.2.

Alcohol is also separated from the liquor stream from the first centrifuge in the form of a condensate from the evaporation vessel 27.1. This condensate is introduced via 28 into the beer still and the alcohol in said condensate is vaporized and concentrated in the rectifying column of the still resulting in water removal therefrom via 32, thus resulting in an overhead vapor of alcohol substantially free of water which is condensed in an air condenser 37.1 thereby resulting in heated air for use as a heat exchange medium for drying of the spent solid grain discussed infra. The water removed from the beer still as a bottom product is separated into two streams, one as an indirect heat exchange medium in heat exchangers 27.2 and 22.1, and the other as a source of the hot water introduced into the mash preparation tank via conduit 44. Fusel oil is removed as a side stream and washed with water via conduit 31 in the fusel oil separator 31.1.

The alcohol from beer still 32.1 is formed into absolute alcohol by azeotrophic distillation in a dehydration column 38.1 using ether as an azeotrope former wherein water is removed overhead with the ether and absolute alcohol as a bottom product. Heat is supplied to the dehydration column by condensing steam in a reboiler 38.2. The overhead vapors of ether and water are cooled by indirect heat exchange in the reboiler 39.1 which generates steam for use as a source of heat in the beer still.

IV. Washer

As stated aforesaid, the hot water from the beer still is separated into three streams, one as a recycle source of hot water via conduit 44 in the mash preparation vessel, and the other as a source of extractant for removal of alcohol from carbon dioxide in vessel 9.3 and the solid spent grain and concurrently as a heating medium for imparting heat to the stream of liquor introduced into the evaporator vessel 27.1. The temperature of the water from the beer still is reduced in heat exchangers 27.2 and 22.1, the latter using cold water (CW) as an indirect heat exchange medium thus controlling the temperature of the water extractant.

V. Drying of Spent Grain

The flash steam from flash cooler 8.1 is compressed to about the same pressure as that of the flash steam 6 from flash cooler 5.1, the heat of compression raising the steam temperature above saturation. This steam is thereafter desuperheated by addition of hot water via conduit 11 which is consequently vaporized. The desuperheated steam is combined with the flash steam 6 via conduit 12 which is then further compressed and desuperheated by further addition of hot water via conduit 14. The resultant flash steam and air heated by heat exchange with the condensing vapor from the rectifying column constitutes substantially the sole source of heat for drying of the spent solid grain. Use of this source of heat greatly results in a reduction of the overall energy required to produce a dry spent grain and an alcohol.

The resultant flash steam may, after drying of the spent solid grain, be recycled and utilized as a source of hot water for desuperheating the flash steams for mash preparation via 43, and in other stages of the overall process where hot water may be required.

EXAMPLE OF THE INVENTION

The parameters of temperature, pressure, volume, etc., reflect the optimum conditions for obtaining the most desired results, although other parameters of the above of substantially the same magnitude both as to maximum and minimum values could certainly be utilized without deviating from the objectives of the invention.

Five hundred fifteen bushels/hour of corn mixed with 6,180 gallons/hour of recycled hot water at a temperature of 212° F. are introduced into the mash preparation tank 4.1, then into a steam ejector continuous cooker 4.2 which is heated to about 285° F. by introducing steam at 6,710 lbs./hour and at a pressure of 150 psig. The resulting mash flows to a first stage flash cooler 5.1 maintained at 8.38 psia wherein the hot mash flashes to 185° F. releasing 7,224 lbs./hour of flash steam. The unflashed material is conveyed to a second stage flash cooler 8.1 maintained at 2.9 psia which flash cools to 140° F. releasing 2,780 lbs./hour of steam. This flash steam is compressed from 2.9 psia to 8.38 psia. The mixed flash steams from both flash coolers are then compressed from 8.38 psia to 25 psia (10 psig). By means of the flash cooling and compression of the resulting flash steams, a total of 11,718 lbs./hour of 10 psig steam is recovered. The power required for compression is 556 kw for the two compressors as illustrated in FIG. 2.

A portion of the water leaving the base of the beer still 32.1 is cooled to 122° F. by the first heat exchanger 27.1 and then to 90° F. by heat exchanger 22.1.

The solids are concentrated to 50% in the evaporator. The vapors from the evaporator are compressed and condensed in the evaporator at 10 psig; the power required to compress the vapors is 1,500 kw.

The heat supplied to the dehydration column 38.1 is obtained by condensing steam (150 psig) in a reboiler 38.2. The steam required for total distillation unit is 20,000 lbs./hour.

The overhead vapors from the rectifying column 32.1 which contains 7.5% water are condensed in an air-cooled condenser 37.1. The latent heat of condensation is 16,265,140 BTU/hour.

The ambient air is heated to 150° F. by heat exchange with the condensing vapor from the rectifying column. This heated air and steam dries the spent distiller's grain to 90% solids and 10% moisture.

The energy usage in the process is:

| Steam at 150° psig | | Steam/Gal. Alcohol |
|---|---|---|
| Cooking: | 6,710 pph | 5.30 |
| Distillation: | 20,000 | 15.85 |
| TOTAL | 26,710 pph | 21.15 |
| Power | | |
| Steam Compression: | 556 kwh/hr. | |
| Evaporator Compression: | 1,500 kwh/hr. | kw/gal. alcohol |
| TOTAL: | 2,056 kwh/hr. | 1.63 |

The figure, depict various theoretical input-output numerical values of parts per hour in the cooking, flash cooling, liquifying, and other parameters of the overall process with reference locations. FIG. 1 is a diagram of the overall system.

The process of the invention as hereinbefore described can readily be adapted to the production of other alcohols and from other sources of alcohol. Thus, the terms "alcohol" and "grain" are regarded generic to any alcohol or natural grain, unless otherwise specifically recited.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. A process for producing an alcohol from a naturally occurring organic material comprising the steps of:
   (a) forming a mixture of said organic material and hot water to form a mash thereof;
   (b) steam cooking said mash in the presence of an enzyme to form an effluent of an aqueous liquor including starch and spent insoluble mash;
   (c) flash cooling said effluent at a first pressure to form flash steam;
   (d) increasing the pressure of said flash steam to form a higher pressure steam;
   (e) saccharifying said effluent in the presence of an enzyme to convert said starch to a sugar;
   (f) fermenting said effluent to form a vapor including carbon dioxide and an alcohol liquor including alcohol and water;
   (g) separating the aqueous liquor containing said alcohol from said insoluble spent mash; and
   (h) heat exchanging said higher pressure steam and said separated insoluble mash to at least effect a partial drying thereof.

2. A process as recited in claim 1, further including the steps of:
   (i) maintaining the flash cooled effluent in a liquifaction holding zone;
   (j) flash cooling the effluent from said liquifaction holding zone to form a second source of flash steam;
   (k) increasing the pressure of said second flash steam; and
   (l) combining said first and second higher pressure flash steams (d and k) thereby to accelerate the drying of said spent mash.

3. A process as recited in claim 1 wherein said separating step (g) includes a distilling operation for forming an overhead vapor product substantially of an aqueous alcohol and a bottom product of substantially water, and wherein said process further includes the steps of:
   (m) condensing said overhead product by indirect heat exchange with air thereby increasing the temperature of the air; and
   (n) heat exchanging said heated air with said separated insoluble spent mash, whereby said spent mash is substantially dried by the combined heat sources of hot air and said higher pressure flash steam (d).

4. A process as recited in claim 2 whereby said spent mash is dried by the combined heat sources of hot air and said flash steam condensate which remove at least 90% of its moisture content.

5. A process as recited in claim 2 wherein hot water is added to one or both of said higher pressure flash steam condensate (d and/or k) to desuperheat said steam condensate prior to heat exchange with said spent mash.

6. A process as recited in claim 5 wherein at least one of said flash streams subsequent to said heat exchange with said spent mash is recycled as said source of hot water.

7. A process as recited in claim 3 wherein said separating step further includes the step prior to the distilling operation of:
   (o) separating the fermentation effluent to form a liquor including an alcohol and water and a solid cake of said insoluble spent mash, said liquor constituting the feed to the evaporation operation.

8. A process as recited in claim 7 further including the steps of:
   (p) treating said solid cake to remove additional liquor therefrom; and
   (q) recycling said additional liquor to said fermenting step (f).

9. A process as recited in claim 8, further including the step of:
   (r) contacting the solid cake from the centrifuging step with a solvent selective for alcohol to separate alcohol therefrom as a recycle product.

10. A process as recited in claim 9 wherein a portion of the water bottom product constitutes the selective solvent for said alcohol.

11. A process as recited in claim 10, further including the step of:
    (s) indirect heat exchanging of the distillation water bottom product with the liquor stream.

12. A process as recited in claim 11, further including the step of:
    (t) indirect heat exchange of the water from the first heat exchanger step wherein the water in the first heat exchanger is reduced to 122° F. and in the second heat exchanger to 90° F.

13. A process as recited in claim 3, further including the step of:
    (u) utilizing a portion of the water bottom product as a source of hot water recited in step (a).

14. A process as recited in claim 11, further including step (u).

15. A process as recited in claim 3, further comprising the step of:
    (v) removing fusel oil as a distillation by-product and washing the same with water.

16. A process as recited in claim 3 wherein said separating step (g) of claim 1 further includes the step of:
    (w) evaporating the aqueous liquor containing alcohol, water, and spent mash to form concentrated spent mash and condensate products; said condensate constituting the feed to the distilling operation.

17. A process as recited in claim 3 further including the step of:
    (x) distilling the aqueous alcohol overhead in the presence of an azeotrope former selective for water to form an overhead vapor essentially of water and said azeotrope former and a substantially dry bottom alcohol product.

18. A process as recited in claim 17 which comprises the step of:
    (y) utilizing the azeotrope overhead product as a source of heat in the distilling operation.

19. A process as recited in claim 1 wherein the naturally occurring organic material is a grain and the alcohol formed is ethanol.

20. A process as recited in claim 17 wherein the naturally occurring organic material is grain and the alcohol formed is ethanol.

21. A process as recited in claim 6 further comprising the step of adding an external source of water to be recycled hot water stream included in step (a).

22. A process as recited in claim 1 which comprises scrubbing the effluent in step (f) to recover an alcohol product therefrom.

23. An improved process for producing an alcohol from grain comprising the steps of:
    (a) producing sugar from grain;

(b) fermenting said sugar forming an effluent including water, alcohol and spent grain;
(c) physically removing a thin liquor including alcohol and water from said spent grain, including residual alcohol;
(d) then extracting residual alcohol from the spent grain; and
(e) distilling said separated alcohol forming an overhead substantially of alcohol.

24. An improved process for producing an alcohol as recited in claim 23 further including the steps of:
(f) evaporating a substantial amount of the residual water and alcohol prior to the distilling step producing overhead condensible vapors;
(g) compressing said condensible vapors; and
(h) utilizing said compressed vapors as a source of heat in said evaporating step.

25. An improved process for obtaining a substantially dry alcohol product comprising the steps of:
(a) distilling an aqueous solution of alcohol forming a first overhead containing about 7.5 percent water;
(b) distilling said overhead in the presence of an azeotrope former producing a substantially dry alcohol bottom product and an overhead product including water and said azeotrope former; and
(c) utilizing said second overhead product vapors as a source of heat in at least one of said distilling steps.

26. An improved process for producing an alcohol from grain comprising the steps of:
(a) forming an aqueous effluent from the grain wherein said effluent includes alcohol, water, and spent solid grain;
(b) separating alcohol and water from the spent solid grain;
(c) distilling the alcohol and water forming an overhead vapor essentially of alcohol and water;
(d) condensing said overhead by indirect heat exchange with air thereby increasing the temperature of said air to a temperature sufficient to supply supplemental heat to dry the spent solid grain; and
(e) at least partially drying said spent solid grain by heat exchange with the heated air.

27. An improved process for producing an alcohol from grain comprising the steps of:
(a) preparation of mash by steam cooking grain in the presence of enzymes to produce fermentable sugar;
(b) fermenting the sugar to produce an effluent including water, alcohol and spent grain;
(c) physically removing a portion of the alcohol, water, and other solubles from said effluent;
(d) then washing the residual alcohol from the spent grain;
(e) evaporating the alcohol and a substantial amount of the water from the soluble alcohol prior to distilling for producing a liquor of non-volatile solubles;
(f) compressing and condensing the alcohol and water vapors to provide heat for said evaporation step;
(g) distilling the alcohol condensate to produce alcohol, recyclable water and distillation heat;
(h) drying said spent grain and said solubles with heat from said cooking steam and said distillation heat; and
(i) recycling said recyclable water.

28. An improved process for producing ethyl alcohol from grain comprising the steps of:
(a) producing sugar from grain;
(b) fermenting said sugar forming an effluent including water, ethyl alcohol and spent grain;
(c) physically removing a portion of the water and ethyl alcohol from the insoluble spent grant;
(d) then washing the alcohol from the insoluble spent grain; and
(e) physically removing the wash water and alcohol from the insoluble spent grain.

* * * * *